United States Patent
Zhao et al.

(10) Patent No.: US 10,976,469 B1
(45) Date of Patent: Apr. 13, 2021

(54) METHOD AND APPARATUS FOR OPTIMAL SELECTION OF FRACTURING STAGE CLUSTERS OF CONTINENTAL SHALE OIL HORIZONTAL WELL

(71) Applicant: DAGANG OIL FIELD COMPANY OF CNPC, Tianjin (CN)

(72) Inventors: Xianzheng Zhao, Tianjin (CN); Lihong Zhou, Tianjin (CN); Xiugang Pu, Tianjin (CN); Wenya Jiang, Tianjin (CN); Zhannan Shi, Tianjin (CN); Fengming Jin, Tianjin (CN); Wenzhong Han, Tianjin (CN); Wei Zhang, Tianjin (CN); Hu Wang, Tianjin (CN); Xiongying Dong, Tianjin (CN)

(73) Assignee: DAGANG OIL FIELD COMPANY OF CNPC, Tianjin (CN)

( * ) Notice: Subject to any disclaimer, the term of this patent is extended or adjusted under 35 U.S.C. 154(b) by 8 days.

(21) Appl. No.: 16/792,736

(22) Filed: Feb. 17, 2020

(30) Foreign Application Priority Data

Nov. 8, 2019 (CN) .......................... 201911088224.1

(51) Int. Cl.
*G01V 99/00* (2009.01)

(52) U.S. Cl.
CPC .................................. *G01V 99/005* (2013.01)

(58) Field of Classification Search
CPC ............................... E21B 43/26; G01V 99/005
See application file for complete search history.

(56) References Cited

U.S. PATENT DOCUMENTS

2018/0094514 A1* 4/2018 Leem ...................... E21B 43/26

* cited by examiner

*Primary Examiner* — Kyle R Quigley
(74) *Attorney, Agent, or Firm* — Calfee Halter & Griswold LLP

(57) ABSTRACT

The present disclosure provide a method and device for optimal selection of fracturing stage clusters of continental shale oil horizontal well. The method includes: acquiring data information of a horizontal well to be fractured and data information of a key cored well; constructing a fracturing cluster evaluation index for the horizontal well according to the data information of the horizontal well to be fractured and the data information of the key cored well; and determining distribution of fracturing clusters and perforated interval clusters using the fracturing cluster evaluation index in conjunction with a principle of differential construction of horizontal well clusters. With the method and the device provided by the embodiment of the present disclosure, the problems of waste of resources and poor effect of oil production by fracturing, caused by uniform or overly dense distribution of clusters are solved.

6 Claims, 4 Drawing Sheets

METHOD AND APPARATUS FOR OPTIMAL SELECTION OF FRACTURING STAGE CLUSTERS OF CONTINENTAL SHALE OIL HORIZONTAL WELL

CROSS REFERENCE TO RELATED APPLICATIONS

This application claims priority to Chinese Application No. 201911088224.1, filed on Nov. 8, 2019, entitled "Method and Apparatus for Optimal Selection of Fracturing Stage Clusters of Horizontal Well", which is specifically and entirely incorporated by reference.

FIELD OF THE INVENTION

Embodiments of the present disclosure relate to the technical field of oil exploration, in particular to a method and apparatus for optimal selection of fracturing stage clusters of a horizontal well.

BACKGROUND OF THE INVENTION

With continuous increase of the conventional oil and gas exploration degree, the difficulty and cost of exploration are becoming increasingly higher with each passing day. Looking for new substitutes has become an important issue that leads the direction of oil and gas exploration today. Unconventional oil and gas such as shale oil and gas and tight oil and gas have the characteristics of rich oil and gas resources, a great potential for exploration, and a low degree of exploration. With continuous improvement of exploration technology and deepening of understanding, unconventional oil and gas such as shale oil and gas have become one of important substitutes in the field of oil and gas. Currently, the global technically recoverable reserves of shale oil are 46.9 billion tons, including 4.48 billion tons in China. Most of unconventional oil and gas in continental lake basins in China are in large-area, low-abundance, and dispersed distribution in mud shale formations in the semi-deep lake-deep lake fine-grained sedimentary areas, and are locally enriched to form sweet spots, which have typical characteristics of extremely low porosity and extremely low permeability, so volume fracturing transformation of horizontal wells in the sweet spot distributed areas is the key to efficient exploration and development of shale oil and gas. Relevant development experience also shows that a technique of staged volume fracturing of a horizontal well is the most effective technology for greatly increasing the production of a single well, reducing the number of wells, saving land resources, and protecting the ecological environment, and is the key to the effective use of low-grade unconventional resources. However, whichever of a method of uniformly designing clusters or a method of designing as many clusters as possible is adopted for a horizontal interval, the effect is not satisfactory. Therefore, it has become an urgent technical problem to be solved in the industry to develop a method for optimal selection of fracturing stage clusters of a horizontal well, whereby stage clusters can be optimally selected for fracturing of the horizontal well, and the problems of waste of resources and poor effect of oil production by fracturing, caused by uniform or overly dense distribution of clusters are avoided.

SUMMARY OF THE INVENTION

In view of the aforementioned problems in the prior art, embodiments of the present disclosure provide a method and apparatus for optimal selection of fracturing stage clusters of a horizontal well.

In a first aspect, an embodiment of the present disclosure provides a method for optimal selection of fracturing stage clusters of a horizontal well, comprising: acquiring data information of a horizontal well to be fractured and data information of a key cored well; constructing a fracturing cluster evaluation index for the horizontal well according to the data information of the horizontal well to be fractured and the data information of the key cored well; and determining distribution of fracturing clusters and perforated interval clusters using the fracturing cluster evaluation index in conjunction with a principle of differential construction of horizontal well clusters.

Optionally, the step of acquiring data information of a horizontal well to be fractured comprises: acquiring the resistivity, interval transit time, compensation density, and total hydrocarbon of gas logging of the horizontal well to be fractured.

Optionally, the step of acquiring data information of a key cored well comprises: acquiring the organic carbon content, free hydrocarbon content, porosity and brittleness index of the key cored well.

Optionally, the step of constructing a fracturing cluster evaluation index for the horizontal well according to the data information of the horizontal well to be fractured and the data information of the key cored well comprises calculating the fracturing cluster evaluation index for the horizontal well according to following formula:

$$SEI = 0.15 \times TOC_{ai} + 0.30 \times Sl_{ai} + 0.20 \times \phi_{ai} + 0.10 \times GAS_{ai} + 0.25 \times BI_{ai}$$

$$TOC_{ai} = \frac{TOC_{bi} - TOC_{min}}{TOC_{max} - TOC_{min}}$$

$$Sl_{ai} = \frac{Sl_{bi} - Sl_{min}}{Sl_{max} - Sl_{min}}$$

$$\phi_{ai} = \frac{\phi_{bi} - \phi_{min}}{\phi_{max} - \phi_{min}}$$

$$GAS_{ai} = \frac{GAS_{bi} - GAS_{min}}{GAS_{max} - GAS_{min}}$$

$$BI_{ai} = \frac{BI_{bi} - BI_{min}}{BI_{max} - BI_{min}}$$

wherein i=1, 2, . . . , m; m is m cluster sites to be optimally selected in the horizontal well; SEI is a fracturing cluster evaluation index for the horizontal well; $TOC_{ai}$ is an organic carbon content after normalization; $Sl_{ai}$ is a free hydrocarbon content after normalization; $\phi_{ai}$ is porosity after normalization; $GAS_{ai}$ is total hydrocarbon of gas logging after normalization; $BI_{ai}$ is a brittleness index after normalization; $TOC_{bi}$ is an organic carbon content before normalization; $TOC_{min}$ is a minimum organic carbon content value of a shale interval of the horizontal well; $TOC_{max}$ is a maximum organic carbon content value of the shale interval of the horizontal well; $Sl_{ib}$, is a free hydrocarbon content before normalization; $Sl_{min}$ is a minimum free hydrocarbon content value of the shale interval of the horizontal well; $Sl_{max}$ is a maximum free hydrocarbon content value of the shale interval of the horizontal well; $\phi_{bi}$ is porosity before normalization; $\phi_{min}$ is a minimum porosity value of the shale interval of the horizontal well; $\phi_{max}$ is a maximum porosity value of the shale interval of the horizontal well; $GAS_{bi}$ is total hydrocarbon of gas logging before normalization; $GAS_{min}$ is a minimum value of the total hydrocarbon of gas logging of the shale interval of the horizontal well; $GAS_{max}$ is a maximum value of the total hydrocarbon of gas logging of the shale interval of the horizontal well; $BI_{bi}$ is a brittleness index before normalization; $BI_{min}$ is a minimum brittleness index value of the shale interval of the horizontal well; and $BI_{max}$ is a maximum brittleness index value of the shale interval of the horizontal well.

Optionally, wherein the step of determining distribution of fracturing clusters and perforated interval clusters using the fracturing cluster evaluation index in conjunction with a principle of differential construction of horizontal well clusters comprises: arranging clusters according to a preset spacing at a position where SEI is greater than or equal to a preset threshold, and grouping the arranged clusters such that each group of clusters forms a perforated interval.

Optionally, the preset threshold comprises: any value within a range of greater than or equal to 0.4 and less than or equal to 0.6.

Optionally, the preset spacing comprises: any value in meter within a range of greater than or equal to 10 and less than or equal to 20.

In a second aspect, an embodiment of the present disclosure provides an apparatus for optimal selection of fracturing stage clusters of a horizontal well, comprising: a data information acquisition module, configured to acquire data information of a horizontal well to be fractured and data information of a key cored well; constructing module, configured to construct a fracturing cluster evaluation index for the horizontal well according to the data information of the horizontal well to be fractured and the data information of the key cored well; and a cluster and perforated interval determination module, configured to determine distribution of fracturing clusters and perforated interval clusters using the fracturing cluster evaluation index in conjunction with a principle of differential construction of horizontal well clusters.

In a third aspect, an embodiment of the present disclosure provides an electronic device, comprising: at least one processor, at least one memory, a communication interface and a bus, wherein the processor, the memory and the communication interface communicate with each other through the bus; and the memory stores program instructions executable by the processor, and the processor calls the program instructions to execute the method for optimal selection of fracturing stage clusters of a horizontal well.

In the method and apparatus for optimal selection of fracturing stage clusters of a horizontal well provided by the embodiment of the present disclosure, by constructing a fracturing cluster evaluation index for the horizontal well according to the data information of the horizontal well to be fractured and the information of the key cored well, and then determining distribution of fracturing clusters and perforated interval clusters, stage clusters can be optimally selected for fracturing of the horizontal well, and the problems of waste of resources and poor effect of oil production by fracturing, caused by uniform or overly dense distribution of clusters are solved.

BRIEF DESCRIPTION OF DRAWINGS

To more clearly describe technical solutions in the embodiments of the present disclosure or in the prior art, a brief introduction to the drawings for use in description of the embodiments or the prior art will be given below. Apparently, the drawings described below are some embodiments of the present disclosure, and for those of ordinary skill in the art, other drawings may also be obtained based on these drawings without creative effort.

DETAILED DESCRIPTION OF THE EMBODIMENTS

To make the objects, technical solutions and advantages of the embodiments of the present disclosure clearer, a clear and complete description of the technical solutions in the embodiments of the present disclosure will be given below in conjunction with the drawings in the embodiments of the present disclosure. Apparently, the embodiments described are part of, rather than all of, the embodiments of the present disclosure. All other embodiments obtained by those of ordinary skill in the art without creative work, based on the embodiments in the present disclosure, fall into the protection scope of the present disclosure. In addition, technical features in various embodiments or a single embodiment provided by the present disclosure can be arbitrarily combined with each other to form a feasible technical solution, but it must be based on implementability by those skilled in the art. When a technical solution combination has contradictions or cannot be implemented, the technical solution combination should be considered to be impossible and not within the protection scope claimed by the present disclosure.

Figure 1:
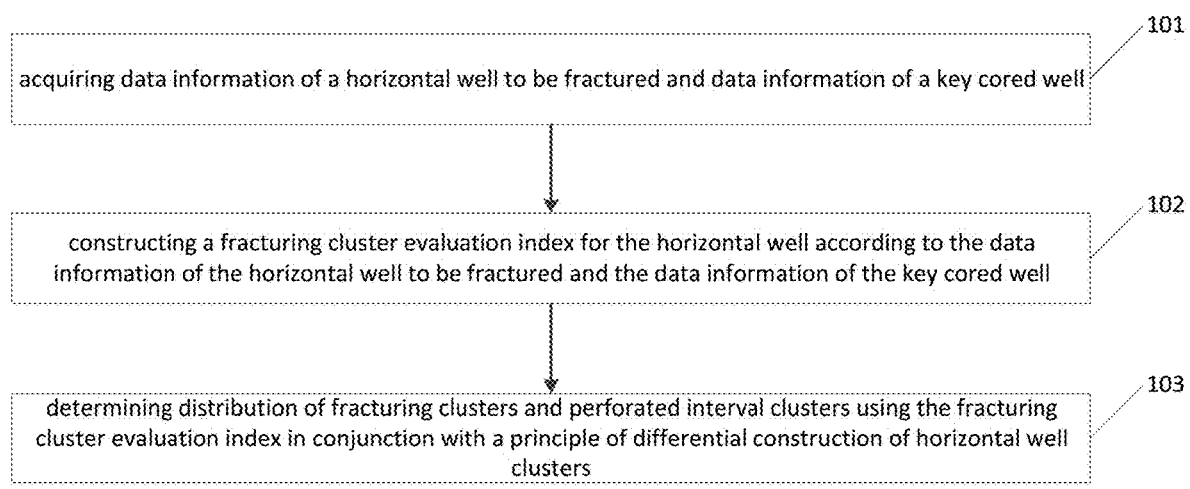
FIG. 1 is a flow diagram of a method for optimal selection of fracturing stage clusters of a horizontal well provided by an embodiment of the present disclosure.

In recent years, several vertical wells in a lower part of a slope of the Ek2 of Cangdong Sag—the fine-grained sedimentary area of the central part of the Paleogene lake basin, have produced industrial oil flow after fracturing and become an important replacement battlefield for future oil and gas exploration. To further improve the effective utilization of shale oil in the area, using horizontal wells and performing staged volume fracturing are inevitable. Using an operation flow of optimal selection of clusters and perforated intervals in the $Ek_2^1 SQ⑨$ 5000 m-5150 m depth interval of the horizontal well GD1701H in the Cangdong Sag as an example, the embodiment of the present disclosure provides a method for optimal selection of fracturing stage clusters of a horizontal well. Referring to FIG. 1, the method includes:

101, acquiring data information of a horizontal well to be fractured and data information of a key cored well; and 102, constructing a fracturing cluster evaluation index for the horizontal well according to the data information of the horizontal well to be fractured and the data information of the key cored well; and 103, determining distribution of fracturing clusters and perforated interval clusters using the fracturing cluster evaluation index in conjunction with a principle of differential construction of horizontal well clusters.

Based on the content of the above method embodiment, as an optional embodiment, in the method for optimal selection of fracturing stage clusters of a horizontal well provided by the embodiment of the present disclosure, the step of acquiring data information of a horizontal well to be fractured includes: acquiring the resistivity, interval transit time, compensation density, and total hydrocarbon of gas logging of a horizontal well to be fractured.

Based on the content of the above method embodiment, as an optional embodiment, in the method for optimal selection of fracturing stage clusters of a horizontal well provided by the embodiment of the present disclosure, the step of acquiring data information of a key cored well includes: acquiring the organic carbon content, free hydrocarbon content, porosity and brittleness index of a key cored well.

Specifically, using a horizontal well GD1701H as an example, the horizontal well is located in a lower part of Nanpi Slope of the Ek2 of Cangdong Sag, with a total depth of 5465.49 m, and has a horizontal interval with a length of 1474 m. A main target strata of the horizontal interval is $Ek_2{}^1$ SQ⑨ ($Ek_2$ can be divided, from bottom to top, into ten fifth-order sequences including $k_2{}^4$SQ①, $Ek_2{}^4$SQ②, etc., wherein $Ek_2{}^1$ SQ⑨ is most advantageous in comprehensive evaluation). First, conventional logging data such as resistivity, interval transit time, and compensation density, and mud logging data of total hydrocarbon of gas logging, etc., of the horizontal well are collected. Second, relevant data information such as an organic carbon interpretation model, a free hydrocarbon interpretation model, a porosity interpretation model and a brittleness index interpretation model of a key cored well in a study area are collected. The key cored well G108-8 is located at a lower part of the Kongxi slope in Cangdong Sag. Continuous coring is performed for nearly 500 m at the EK2 of the cored well. The cored interval has rich and detailed analytic assay data. Whole rock X-ray diffraction is designed for mineral components and TOC, Sl and other test samples at more than 1,000 blocks each time. The organic carbon interpretation model, the free hydrocarbon interpretation model, the porosity interpretation model and the brittleness index interpretation model of the study area are established by using the analytical assay data of the well. Finally, the logging interpretation models established for the key cored well G108-8 are applied to the horizontal well GD1701H to be fractured to obtain organic carbon (TOC), free hydrocarbon (Sl), porosity ($\phi$), brittleness index (BI) and other key data of the well.

Based on the content of the above method embodiment, as an optional embodiment, in the method for optimal selection of fracturing stage clusters of a horizontal well provided by the embodiment of the present disclosure, the step of constructing a fracturing cluster evaluation index for the horizontal well according to the data information of the horizontal well to be fractured and the data information of the key cored well comprises calculating the fracturing cluster evaluation index for the horizontal well according to following formula:

$$SEI = 0.15 \times TOC_{ai} + 0.30 \times Sl_{ai} + 0.20 \times \phi_{ai} + 0.10 \times GAS_{ai} + 0.25 \times BI_{ai} \quad (1)$$

$$TOC_{ai} = \frac{TOC_{bi} - TOC_{min}}{TOC_{max} - TOC_{min}} \quad (2)$$

$$Sl_{ai} = \frac{Sl_{bi} - Sl_{min}}{Sl_{max} - Sl_{min}} \quad (3)$$

$$\phi_{ai} = \frac{\phi_{bi} - \phi_{min}}{\phi_{max} - \phi_{min}} \quad (4)$$

$$GAS_{ai} = \frac{GAS_{bi} - GAS_{min}}{GAS_{max} - GAS_{min}} \quad (5)$$

$$BI_{ai} = \frac{BI_{bi} - BI_{min}}{BI_{max} - BI_{min}} \quad (6)$$

wherein i=1, 2, . . . , m; m is a number of cluster sites to be optimally selected in the horizontal well, i.e. there are m cluster sites to be optimally selected in the horizontal well; SEI is a fracturing cluster evaluation index for the horizontal well, dimensionless, with a range of values greater than or equal to 0 and less than or equal to 1; $TOC_{ai}$ is an organic carbon content after normalization, dimensionless, with a range of values greater than or equal to 0 and less than or equal to 1; $Sl_{ai}$ is a free hydrocarbon content after normalization, dimensionless, with a range of values greater than or equal to 0 and less than or equal to 1; $\phi_{ai}$ is porosity after normalization, dimensionless, with a range of values greater than or equal to 0 and less than or equal to 1; $GAS_{ai}$ is the total hydrocarbon of gas logging after normalization, dimensionless, with a range of values greater than or equal to 0 and less than or equal to 1; $BI_{ai}$ is a brittleness index after normalization, dimensionless, with a range of values greater than or equal to 0 and less than or equal to 1; $TOC_{bi}$ is an organic carbon content before normalization, in %; $TOC_{min}$ is a minimum organic carbon content value of a shale interval of the horizontal well, in %; $TOC_{max}$ is a maximum organic carbon content value of the shale interval of the horizontal well, in %; $Sl_{bi}$ is a free hydrocarbon content before normalization, in mg/g; $Sl_{min}$ is a minimum free hydrocarbon content value of the shale interval of the horizontal well, in mg/g; $Sl_{max}$ is a free hydrocarbon content maximum value of the shale interval of the horizontal well, in mg/g; $O_{bi}$ is porosity before normalization, in %; $\phi_{min}$ is a minimum porosity value of the shale interval of the horizontal well, in %; $\phi_{max}$ is a maximum porosity value of the shale interval of the horizontal well, in %; $GAS_{bi}$ is total hydrocarbon of gas logging before normalization, in %; $GAS_{min}$ is a minimum value of the total hydrocarbon of gas logging of the shale interval of the horizontal well, in %; $GAS_{max}$ is a maximum value of the total hydrocarbon of gas logging of the shale interval of the horizontal well, in %; $BI_{bi}$ is a brittleness index before normalization, dimensionless, with a range of values greater than or equal to 0 and less than or equal to 100; $BI_{min}$ is a minimum brittleness index value of the shale interval of the horizontal well, dimensionless; and $BI_{max}$ is a maximum brittleness index value of the shale interval of the horizontal well, dimensionless.

Based on the content of the above method embodiment, as an optional embodiment, in the method for optimal selection of fracturing stage clusters of a horizontal well provided by the embodiment of the present disclosure, the step of determining distribution of fracturing clusters and perforated interval clusters using the fracturing cluster evaluation index in conjunction with a principle of differential construction of horizontal well clusters includes: arranging clusters according to a preset spacing at a position where SEI is greater than or equal to a preset threshold, and grouping the arranged clusters such that each group of clusters forms a perforated interval.

Based on the content of the above method embodiment, as an optional embodiment, in the method for optimal selection of fracturing stage clusters of a horizontal well provided by the embodiment of the present disclosure, the preset threshold includes: any value within the range of greater than or equal to 0.4 and less than or equal to 0.6. The value may specifically be 0.5.

Based on the content of the above method embodiment, as an optional embodiment, in the method for optimal selection of fracturing stage clusters of a horizontal well provided by the embodiment of the present disclosure, the preset distance includes: any value in meter within the range of greater than or equal to 10 and less than or equal to 20. The value may specifically be 15 m.

Figure 2:
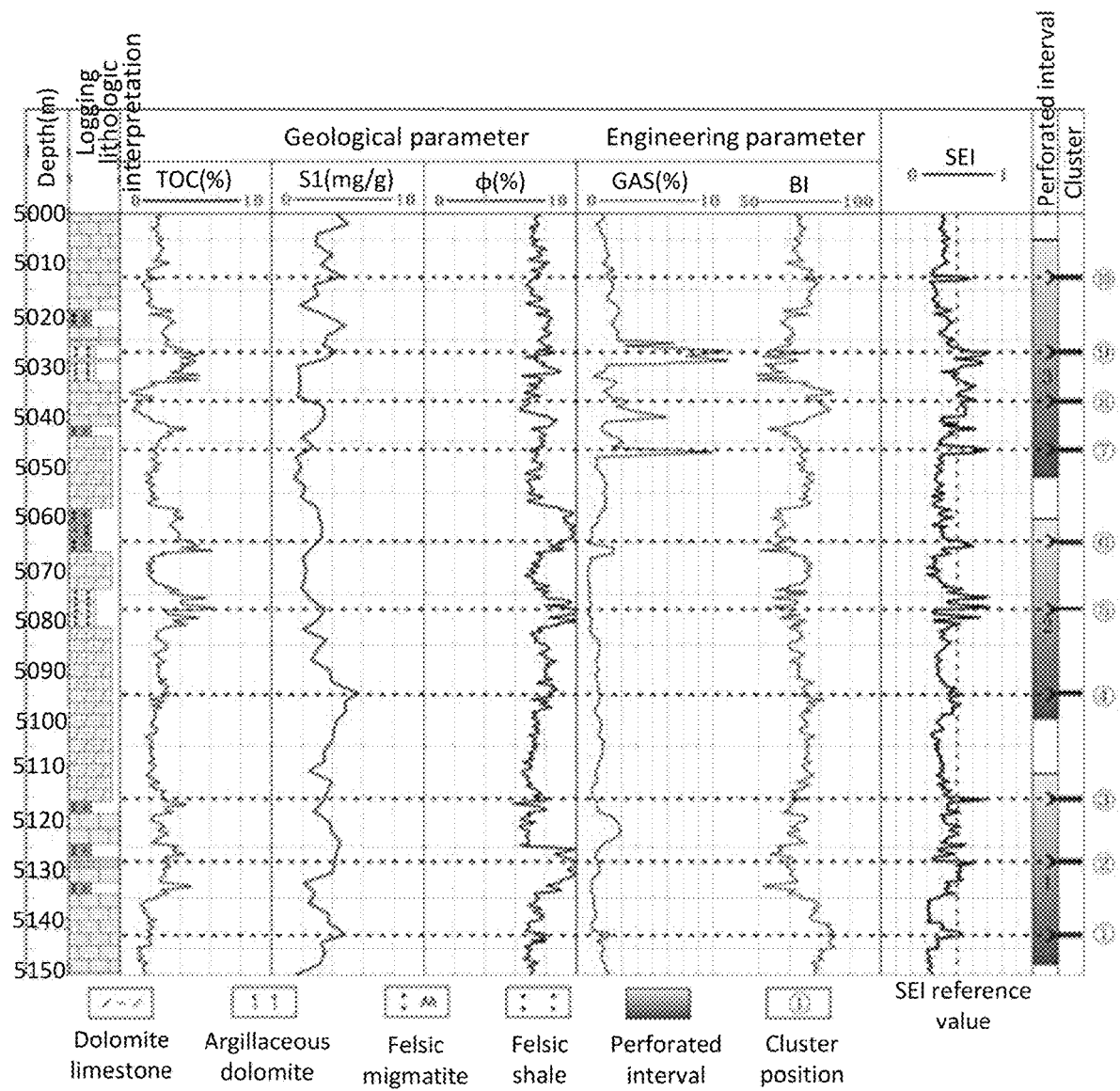
FIG. 2 is a schematic diagram of optimally selecting fracturing clusters and perforated intervals in the $Ek2^1 SQ⑨$ 5000 m-5150 m depth interval of the well GD1701H provided by an embodiment of the present disclosure.

Specifically, by using the obtained five key geological and engineering data related to the organic carbon, free hydrocarbon, porosity, mud logging data of total hydrocarbon of gas logging (GAS) and brittleness index, an advantageous fracturing cluster comprehensive evaluation index SEI for the horizontal well is constructed according to formula (1), and the organic carbon content, free hydrocarbon content, porosity, total hydrocarbon value of gas logging and brittleness index after normalization are respectively multiplied with corresponding weights, and the products are summed to form SEI data. Specifically, referring to FIG. 2, in which the 5000 m-5150 m depth interval in a horizontal interval of the well GD1701H is optimally selected as an object for detailed analysis on cluster selection and section determination (for logging lithologic interpretations, see corresponding interpretations of modules at the lower part of FIG. 2, and this will not be repeated here). Key data on organic carbon (TOC), free hydrocarbons (S1), porosity ($\phi$), total hydrocarbon of gas logging (GAS), brittleness index (BI), comprehensive evaluation index (SEI) and the like is imported into geological work software. The data on organic carbon, free hydrocarbons, porosity, total hydrocarbon of gas logging and brittleness index is data obtained after calculation of the logging interpretation models of the well G108-8. SEI is a value obtained after calculation of formula (1). It can comprehensively reflect the degree of oil enrichment in shale formations and the feasibility of fracturing. The higher the value is, the more oil gas is obtained after the fracturing of the stratum. The exploration practice proves that if SEI is greater than 0.5 (a reference value, that is, a middle dashed part of the SEI item), it can be used as a location for optimal selection of clusters. A good fracturing effect can be achieved when the distance between any two clusters of the horizontal well is maintained between 10 m-20 m. Therefore, differential design and optimal selection of clusters are carried out based on the magnitude of SEI and the distance between the clusters. The number of clusters can be increased appropriately in a well section with a higher overall SEI, and the number of clusters can be reduced appropriately in a horizontal interval with a lower overall SEI, which is a basic principle of "cluster selection based on five high data and differential design". According to this principle, a total of 10 clusters are optimally selected in the 5000 m-5150 m depth interval of the well GD1701H. For example, cluster ① is mainly composed of argillaceous dolomite in lithology, with an organic carbon content of 2.1%, a high free hydrocarbon content of about 5 mg/g, and a relatively high porosity of 8%, a total hydrocarbon content of 2% in gas logging, and a high brittleness index of 85, which meet the "five high" characteristics, and its SEI value is calculated to be 0.55, which is higher than the reference value of 0.5. Thus, ① is a good cluster location. Finally, perforated intervals 1, 2 and 3 are formed according to a principle of 3-4 clusters forming a perforated interval, wherein the perforated interval 1 includes three clusters, namely clusters ①, ② and ③; the perforated interval 2 includes three clusters, namely clusters ④, ⑤ and ⑥; and the perforated interval 3 includes four clusters, namely clusters ⑦, ⑧, ⑨ and ⑩. This is a dense cluster design.

In this way, a complete solution of fracturing clusters and perforated intervals of the horizontal well is formed.

The method for optimal selection of fracturing stage clusters of a horizontal well provided by the embodiment of the present disclosure is applied to a design of clusters of two horizontal wells GD1701H and GD1702H. A horizontal interval of the well GD1701H is 1465 m long, designed with 69 clusters in total, and further with 21 perforated intervals according to the cluster design solution. After volume fracturing transformation, the well GD1701H can produce up to 75.9 cubic meters of oil per day and 5200 cubic meters of gas per day. System blow off is carried out for 471 days, with a total oil production of 7673.7 cubic meters and a total gas production of 415435 cubic meters, and a flowback rate of 41.3%, which is currently basically stable at 13 cubic meters per interval. A horizontal interval of the well GD1702H is 1317.83 m long, designed with 71 clusters in total, and further with 21 perforated intervals according to the cluster design solution. After volume fracturing transformation, the well GD1702H can produce up to 61 cubic meters of oil per day and 5200 cubic meters of gas per day. System blow off is carried out for 488 days, with a total oil production of 9650.7 cubic meters and a total gas production of 615435 cubic meters, and a flowback rate of 34.32%, which is currently basically stable at 19 cubic meters per interval. This further proves the practicality, reliability and economy of the method for optimal selection of volume fracturing clusters of a horizontal well. Under the current economic and technological conditions, this method can effectively guide the optimal selection of clusters and perforated intervals of horizontal wells, and meets the requirement of continental shale oil exploration.

In the method for optimal selection of fracturing stage clusters of a horizontal well provided by the embodiment of the present disclosure, by constructing a fracturing cluster evaluation index for the horizontal well according to the data information of the horizontal well to be fractured and the information of the key cored well, and then determining distribution of fracturing clusters and perforated interval clusters, stage clusters can be optimally selected for fracturing of the horizontal well, and the problems of waste of resources and poor effect of oil production by fracturing, caused by uniform or overly dense distribution of clusters are solved.

Figure 3:
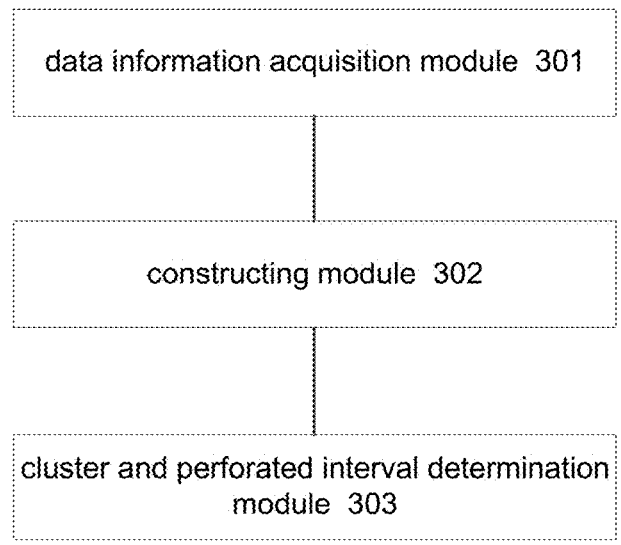
FIG. 3 is a structure digram of a apparatus for optimal selection of fracturing stage clusters of a horizontal well provided by an embodiment of the present disclosure.

The embodiments of the present disclosure are achieved based on programmatic processing by a device with a processor function. Therefore, in engineering practice, the technical solutions and functions of the embodiments of the present disclosure can be packaged into various modules. In view of this reality, on the basis of the foregoing embodiments, an embodiment of the present disclosure provides an apparatus for optimal selection of fracturing stage clusters of a horizontal well. The apparatus is used for executing the method for optimal selection of fracturing stage clusters of a horizontal well in the foregoing method embodiment. Referring to FIG. 3, the apparatus includes:

a data information acquisition module 301, configured to acquire data information of a horizontal well to be fractured and data information of a key cored well;

constructing module 302, configured to construct a fracturing cluster evaluation index for the horizontal well according to the data information of the horizontal well to be fractured and the data information of the key cored well; and a cluster and perforated interval determination module 303, configured to determine distribution of fracturing clusters and perforated interval clusters using the fracturing cluster evaluation index in conjunction with a principle of differential construction of horizontal well clusters.

In the apparatus for optimal selection of fracturing stage clusters of a horizontal well provided by the embodiment of the present disclosure, the data information acquisition module, constructing module and the cluster and perforated interval determination module are adopted, a fracturing cluster evaluation index for a horizontal well is constructed according to the data information of the horizontal well to be fractured and the data information of the key cored well, and then distribution of fracturing clusters and perforated interval clusters is determined, so that stage clusters can be optimally selected for fracturing of the horizontal well, and the problems of waste of resources and poor effect of oil production by fracturing, caused by uniform or overly dense distribution of clusters are solved.

It needs to be noted that in addition to implementing the method in the foregoing method embodiment, the apparatus in the apparatus embodiment provided by the present disclosure can also be used for implementing methods in other method embodiments provided by the present disclosure. The only difference lies in providing corresponding functional modules. Its principle is basically the same as that of the foregoing apparatus embodiment provided by the present disclosure. As long as those skilled in the art can, based on the forgoing apparatus embodiment, with reference to specific technical solutions in other method embodiments, obtain corresponding means and technical solutions constituted by the technical means, by combining technical features, the apparatus in the above apparatus embodiment can be improved while ensuring applicability of the technical solutions, so as to obtain corresponding apparatus embodiments for implementing methods in other method embodiments. For example:

Based on the content of the above apparatus embodiment, as an optional embodiment, the apparatus for optimal selection of fracturing stage clusters of a horizontal well provided by the embodiment of the present disclosure further includes a to-be-fractured horizontal well data information acquisition module for acquiring a resistivity, interval transit time, compensation density, and total hydrocarbon of gas logging of a horizontal well to be fractured.

Based on the content of the above apparatus embodiment, as an optional embodiment, the apparatus for optimal selection of fracturing stage clusters of a horizontal well provided in the embodiment of the present disclosure further includes a key-cored-well data information acquisition module for acquiring the organic carbon content, free hydrocarbon content, porosity and brittleness index of a key cored well.

Figure 4:
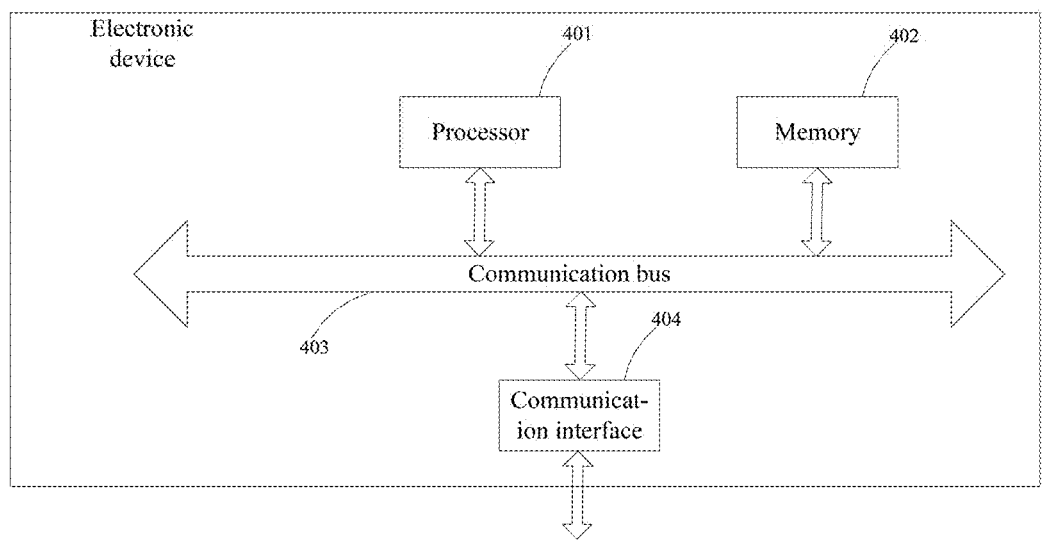
FIG. 4 is a physical structure diagram of an electronic device provided by an embodiment of the present disclosure.

The method in the embodiment of the present disclosure is implemented by using an electronic device, so it is necessary to introduce the relevant electronic device. To this end, an embodiment of the present disclosure provides an electronic device, as shown in FIG. 4, including at least one processor 401, a communication interface 404, at least one memory 402 and a communication bus 403, wherein the at least one processor 401, the communication interface 404 and the at least one memory 402 communicate with each other through the communication bus 403. The at least one processor 401 may call logic instructions in the at least one memory 402 to execute the following method: acquiring data information of a horizontal well to be fractured and data information of a key cored well; and constructing a fracturing cluster evaluation index for the horizontal well according to the data information of the horizontal well to be fractured and the data information of the key cored well, and determining distribution of fracturing clusters and perforated interval clusters using the fracturing cluster evaluation index in conjunction with a principle of differential construction of horizontal well clusters.

In addition, the logic instructions in the at least one memory 402 may be stored in a computer readable storage medium if implemented in the form of a software functional unit and sold or used as a separate product. With this understanding, the technical solutions of the present disclosure, in essence or for the part contributing to the prior art or for part of the technical solutions, can be embodied in the form of a software product, and the computer software product is stored in a storage medium, and includes a number of instructions configured to enable a computer device (which may be a personal computer, a server, a network device or the like) to execute all or part of the steps of the method described in the embodiments of the present disclosure, such as including acquiring data information of a horizontal well to be fractured and data information of a key cored well; and constructing a fracturing cluster evaluation index for the horizontal well according to the data information of the horizontal well to be fractured and the data information of the key cored well, and determining distribution of fracturing clusters and perforated interval clusters using the fracturing cluster evaluation index in conjunction with a principle of differential construction of horizontal well clusters. The aforementioned storage medium includes: a USB flash disk, a mobile hard disk, a read-only memory (ROM), a random access memory (RAM), a magnetic disk, an optical disk or other various media that can store program codes.

The apparatus embodiment described above is merely schematic, wherein units described as separate components may be or may be not physically separate, and components shown as units may be or may be not physical units, i.e. may be located in one place, and may also be distributed in multiple network units. Some or all of the modules may be selected according to actual needs to achieve the object of the solution of the embodiment. They can be understood and implemented by those of ordinary skill in the at without creative effort.

From the above description of implementations, those skilled in the art can clearly know that the various implementations may be achieved by means of software and a necessary general-purpose hardware platform, and of course, may also be achieved by hardware. With this understanding, the technical solutions described above, in essence or for the part contributing to the prior art, may be embodied in the form of a software product, and the computer software product may be stored in a computer readable storage medium, such as an ROM/RAM, a magnetic disk, an optical disc or the like, and includes a number of instructions for enabling a computer device (which may be a personal computer, a server, a network device or the like) to execute the method described in the embodiments or in parts of the embodiments.

The flowchart and block diagrams in the drawings illustrate the architecture, functionality, and operation of possible implementations of a system, method and computer program product according to multiple embodiments of the present disclosure. Based on this knowledge, each block in the flowchart or block diagram may represent a module, a program segment, or a portion of codes, which contains one or more executable instructions for implementing a specified logical function. It should also be noted that in some alternative implementations, the functions indicated in the blocks may also occur in a different order from that indicated in the drawings. For example, two consecutive blocks may actually be executed substantially in parallel, or sometimes in the reverse order, depending on the function involved. It should also be noted that each block in the block diagrams and/or flowchart, and combinations of blocks in the block diagrams and/or flowchart, may be implemented by a dedicated, hardware-based system that performs a specified function or operation, or it may be implemented by a combination of dedicated hardware and computer instructions.

In the patent, the terms "comprise", "include" or any other variations thereof are intended to encompass non-exclusive inclusion, such that a process, method, article, or device that includes a series of elements includes not only those elements, but also other elements not explicitly listed, or elements inherent to such a process, method, article, or device. Without more restrictions, elements defined by the wording "including . . . " do not exclude the existence of other identical elements in the process, method, article, or device including the elements.

Finally, it should be noted that the above embodiments are only used for illustrating rather than limiting the technical solutions of the present disclosure. Although the present disclosure is described in detail with reference to the foregoing embodiments, those of ordinary skill in the art should understand that they still can make modifications to the technical solutions disclosed in the foregoing embodiments or make equivalent substitutions to part of technical features thereof; and such modifications or substitutions should not cause the essence of the corresponding technical solutions to depart from the spirit and scope of the technical solutions of the embodiments of the present disclosure.

The invention claimed is:

1. A method for optimal selection of fracturing stage clusters of a horizontal well, comprising:
  acquiring data information of a horizontal well to be fractured and data information of a key cored well;
  constructing a fracturing cluster evaluation index for the horizontal well according to the data information of the horizontal well to be fractured and the data information of the key cored well; and
  determining distribution of fracturing clusters and perforated interval clusters using the fracturing cluster evaluation index in conjunction with a principle of differential construction of horizontal well clusters,
  wherein the step of acquiring data information of a horizontal well to be fractured comprises:
  acquiring the resistivity, interval transit time, compensation density, and total hydrocarbon of gas logging of the horizontal well to be fractured,
  wherein the step of acquiring data information of a key cored well comprises:
  acquiring the organic carbon content, free hydrocarbon content, porosity and brittleness index of the key cored well,
  wherein the step of constructing a fracturing cluster evaluation index of the horizontal well according to the data information of the horizontal well to be fractured and the data information of the key cored well comprises calculating the fracturing cluster evaluation index for the horizontal well according to following formula:

$$SEI = 0.15 \times TOC_{ai} + 0.30 \times Sl_{ai} + 0.20 \times \phi_{ai} + 0.10 \times GAS_{ai} + 0.25 \times BI_{ai}$$

$$TOC_{ai} = \frac{TOC_{bi} - TOC_{min}}{TOC_{max} - TOC_{min}}$$

$$Sl_{ai} = \frac{Sl_{bi} - Sl_{min}}{Sl_{max} - Sl_{min}}$$

$$\phi_{ai} = \frac{\phi_{bi} - \phi_{min}}{\phi_{max} - \phi_{min}}$$

$$GAS_{ai} = \frac{GAS_{bi} - GAS_{min}}{GAS_{max} - GAS_{min}}$$

$$BI_{ai} = \frac{BI_{bi} - BI_{min}}{BI_{max} - BI_{min}}$$

wherein i=1, 2, . . . , m; m is a number of cluster sites to be optimally selected in the horizontal well; SEI is a fracturing cluster evaluation index for the horizontal well; $TOC_{ai}$ is an organic carbon content after normalization; $Sl_{ai}$ is a free hydrocarbon content after normalization; $\phi_{ai}$ is porosity after normalization; $GAS_{ai}$ is total hydrocarbon of gas logging after normalization; $BI_{ai}$ is a brittleness index after normalization; $TOC_{ai}$ is an organic carbon content before normalization; $TOC_{min}$ is a minimum organic carbon content value of a shale interval of the horizontal well; $TOC_{max}$ is a maximum organic carbon content value of the shale interval of the horizontal well; $Sl_{bi}$ is a free hydrocarbon content before normalization; $Sl_{min}$ is a minimum free hydrocarbon content value of the shale interval of the horizontal well; $Sl_{max}$ is a maximum free hydrocarbon content value of the shale interval of the horizontal well, $\phi_{bi}$ is a porosity before normalization, $\phi_{min}$ is a minimum porosity value of the shale interval of the horizontal well; $\phi_{max}$ is a maximum porosity value of the shale interval of the horizontal well; $GAS_{bi}$ is total hydrocarbon of gas logging before normalization; $GAS_{min}$ is a minimum value of the total hydrocarbon of gas logging of the shale interval of the horizontal well, $GAS_{max}$ is a maximum value of the total hydrocarbon of gas logging of the shale interval of the horizontal well; $BI_{bi}$ is a brittleness index before normalization; $BI_{min}$ is a minimum brittleness index value of the shale interval of the horizontal well; and $BI_{max}$ is a maximum brittleness index value of the shale interval of the horizontal well.

2. The method for optimal selection of fracturing stage clusters of a horizontal well according to claim 1, wherein the step of determining distribution of fracturing clusters and perforated interval clusters using the fracturing cluster evaluation index in conjunction with a principle of differential construction of horizontal well clusters comprises:
  arranging clusters according to a preset spacing at a position where SEI is greater than or equal to a preset threshold, and grouping the arranged clusters such that each group of clusters forms a perforated interval.

3. The method for optimal selection of fracturing stage clusters of a horizontal well according to claim 2, wherein the preset threshold comprises:
  any value within a range of greater than or equal to 0.4 and less than or equal to 0.6.

4. The method for optimal selection of fracturing stage clusters of a horizontal well according to claim 2, wherein the preset spacing comprises:
  any value in meter within a range of greater than or equal to 10 and less than or equal to 20.

5. An electronic device, comprising:
  at least one processor, at least one memory, a communication interface and a bus, wherein the processor, the memory and the communication interface communicate with each other through the bus; and the memory stores program instructions executable by the processor, and the processor calls the program instructions to execute the method of claim 1.

6. An apparatus for optimal selection of fracturing stage clusters of a horizontal well, comprising:

a data information acquisition module, configured to acquire data information of a horizontal well to be fractured and data information of a key cored well;

constructing module, configured to construct a fracturing cluster evaluation index for the horizontal well according to the data information of the horizontal well to be fractured and the data information of the key cored well; and a cluster and perforated interval determination module, configured to determine distribution of fracturing clusters and perforated interval clusters using the fracturing cluster evaluation index in conjunction with a principle of differential construction of horizontal well clusters, wherein the data information acquisition is further configured to:

acquiring the resistivity, interval transit time, compensation density, and total hydrocarbon of gas logging of the horizontal well to be fractured, and acquiring the organic carbon content, free hydrocarbon content, porosity and brittleness index of the key cored well, wherein the constructing module comprises calculating the fracturing cluster evaluation index for the horizontal well according to following formula:

$$SEI = 0.15 \times TOC_{ai} + 0.30 \times Sl_{ai} + 0.20 \times \phi_{ai} + 0.10 \times GAS_{ai} + 0.25 \times BI_{ai}$$

$$TOC_{ai} = \frac{TOC_{bi} - TOC_{min}}{TOC_{max} - TOC_{min}}$$

$$Sl_{ai} = \frac{Sl_{bi} - Sl_{min}}{Sl_{max} - Sl_{min}}$$

$$\phi_{ai} = \frac{\phi_{bi} - \phi_{min}}{\phi_{max} - \phi_{min}}$$

$$GAS_{ai} = \frac{GAS_{bi} - GAS_{min}}{GAS_{max} - GAS_{min}}$$

$$BI_{ai} = \frac{BI_{bi} - BI_{min}}{BI_{max} - BI_{min}}$$

wherein i=1, 2, ..., m; m is a number of cluster sites to be optimally selected in the horizontal well; SEI is a fracturing cluster evaluation index for the horizontal well; $TOC_{ai}$ is an organic carbon content after normalization; $Sl_{ai}$ is a free hydrocarbon content after normalization; $\phi_{ai}$ is porosity after normalization; $GAS_{ai}$ is total hydrocarbon of gas logging after normalization; $BI_{ai}$ is a brittleness index after normalization; $TOC_{bi}$ is an organic carbon content before normalization; $TOC_{min}$ is a minimum organic carbon content value of a shale interval of the horizontal well; $TOC_{max}$ is a maximum organic carbon content value of the shale interval of the horizontal well; $Sl_{bi}$ is a free hydrocarbon content before normalization; $Sl_{min}$ is a minimum free hydrocarbon content value of the shale interval of the horizontal well; $Sl_{max}$ is a maximum free hydrocarbon content value of the shale interval of the horizontal well, $\phi_{bi}$ is a porosity before normalization, $\phi_{min}$ is a minimum porosity value of the shale interval of the horizontal well; $\phi_{max}$ is a maximum porosity value of the shale interval of the horizontal well; $GAS_{bi}$ is total hydrocarbon of gas logging before normalization; $GAS_{min}$ is a minimum value of the total hydrocarbon of gas logging of the shale interval of the horizontal well, $GAS_{max}$ is a maximum value of the total hydrocarbon of gas logging of the shale interval of the horizontal well; $BI_{bi}$ is a brittleness index before normalization; $BI_{min}$ is a minimum brittleness index value of the shale interval of the horizontal well; and $BI_{max}$ is a maximum brittlesness index value of the shale interval of the horizontal well.

\* \* \* \* \*